US012673460B2

(12) United States Patent
Ishida et al.

(10) Patent No.: US 12,673,460 B2
(45) Date of Patent: Jul. 7, 2026

(54) METHOD FOR MANUFACTURING THREE-DIMENSIONAL SHAPED OBJECT, AND THREE-DIMENSIONAL SHAPING APPARATUS

(71) Applicant: SEIKO EPSON CORPORATION, Tokyo (JP)

(72) Inventors: Masaya Ishida, Hara (JP); Momoko Wakabayashi, Hachinohe (JP); Toshiki Sano, Hachinohe (JP); Hideki Ishigami, Hachinohe (JP); Kei Hiruma, Chino (JP); Seiichi Taniguchi, Asahi (JP); Kenji Kitada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 149 days.

(21) Appl. No.: 18/191,117

(22) Filed: Mar. 28, 2023

(65) Prior Publication Data

US 2023/0311409 A1    Oct. 5, 2023

(30) Foreign Application Priority Data

Mar. 29, 2022    (JP) ................................. 2022-053041

(51) Int. Cl.
B29C 64/165        (2017.01)
B29C 64/209        (2017.01)
(Continued)

(52) U.S. Cl.
CPC .......... B29C 64/165 (2017.08); B29C 64/209 (2017.08); *B29C 64/393* (2017.08);
(Continued)

(58) Field of Classification Search
CPC ........................... B29C 64/165; B29C 64/209
See application file for complete search history.

(56) References Cited

U.S. PATENT DOCUMENTS

2004/0222549 A1* 11/2004 Sano ...................... B33Y 70/10
                                                                347/1
2005/0017394 A1*  1/2005 Hochsmann ........... B33Y 10/00
                                                                425/375
(Continued)

FOREIGN PATENT DOCUMENTS

EP         3912750  A1    11/2021
JP     2005-120475  A     5/2005
(Continued)

*Primary Examiner* — Andrew D Graham
(74) *Attorney, Agent, or Firm* — Harness, Dickey & Pierce, P.L.C.

(57) ABSTRACT

Provided is a method for manufacturing a three-dimensional shaped object, the manufacturing method including: a powder layer formation step of disposing powders containing a forming material of the three-dimensional shaped object in a layer shape and forming a powder layer having a predetermined thickness; and a molded body formation step of discharging, to the powder layer, a binder liquid containing a binder for binding the powders to one another, and forming a molded body in which the powders are bound to one another. In the molded body formation step, in a formation region of the molded body in the powder layer, a discharging amount of the binder liquid per unit area to a first formation region that is a contour portion of the formation region and a discharging amount of the binder liquid per unit area to a second formation region other than the contour portion are discharging amounts different from each other.

5 Claims, 10 Drawing Sheets

(51) Int. Cl.

| | | |
|---|---|---|
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.

CPC ............... *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2005/0079086 A1* | 4/2005 | Farr | ........................ | B33Y 10/00 |
| | | | | 419/36 |
| 2005/0218549 A1* | 10/2005 | Farr | ..................... | G03F 7/0047 |
| | | | | 425/375 |
| 2006/0071367 A1* | 4/2006 | Hunter | ................... | B33Y 10/00 |
| | | | | 700/118 |

| | | | | |
|---|---|---|---|---|
| 2016/0332373 A1* | 11/2016 | Kuhn | ..................... | B33Y 30/00 |
| 2018/0079193 A1* | 3/2018 | Ishida | .................. | B29C 64/112 |
| 2019/0111618 A1* | 4/2019 | Saito | ........................ | C08K 3/10 |
| 2019/0160739 A1* | 5/2019 | Olson | ..................... | C08L 35/02 |
| 2019/0202127 A1* | 7/2019 | Ng | ............................ | B22F 1/10 |
| 2020/0338819 A1* | 10/2020 | Hinch | ...................... | C08K 3/38 |
| 2021/0162502 A1* | 6/2021 | Rushkin | ................. | B22F 10/64 |
| 2021/0170680 A1* | 6/2021 | Bromberg | .............. | B22F 12/63 |
| 2021/0187612 A1* | 6/2021 | Kasperchik | ........... | B33Y 30/00 |
| 2021/0237156 A1* | 8/2021 | Kasperchik | ............. | B22F 10/14 |

FOREIGN PATENT DOCUMENTS

| | | |
|---|---|---|
| JP | 2017-094587 A | 6/2017 |
| JP | 2019-157217 A | 9/2019 |
| JP | 6862735 B2 | 4/2021 |
| WO | 2019-079704 A2 | 4/2019 |

* cited by examiner

Figure 3:
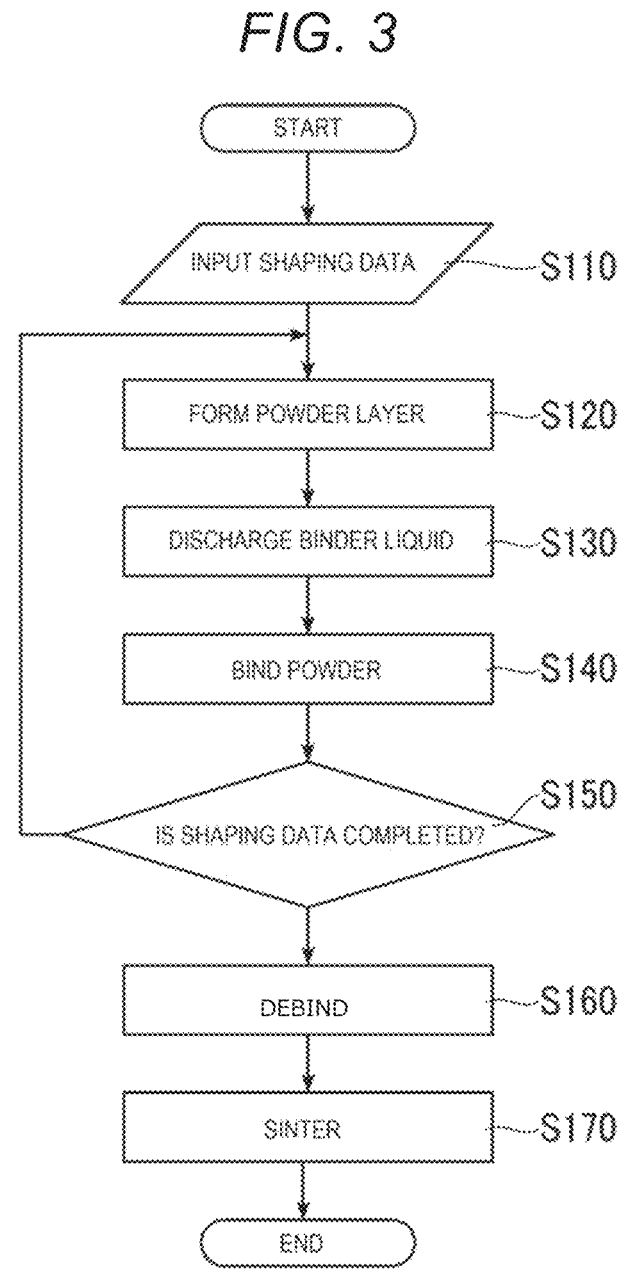

```
            ┌──────────────┐
            │    START     │
            └──────────────┘
                   │
            ╱──────────────╲
           ╱ INPUT SHAPING  ╲────── S110
           ╲     DATA       ╱
            ╲──────────────╱
                   │
            ┌──────────────┐
            │ FORM POWDER  │────── S120
            │    LAYER     │
            └──────────────┘
                   │
            ┌──────────────┐
            │   DISCHARGE  │────── S130
            │ BINDER LIQUID│
            └──────────────┘
                   │
            ┌──────────────┐
            │ BIND POWDER  │────── S140
            └──────────────┘
                   │
            ◇──────────────◇
            ◇ IS SHAPING    ◇───── S150
            ◇ DATA          ◇
            ◇ COMPLETED?    ◇
            ◇──────────────◇
                   │
            ┌──────────────┐
            │   DEBIND     │────── S160
            └──────────────┘
                   │
            ┌──────────────┐
            │   SINTER     │────── S170
            └──────────────┘
                   │
            ┌──────────────┐
            │     END      │
            └──────────────┘
```

FIG. 5

FIG. 9
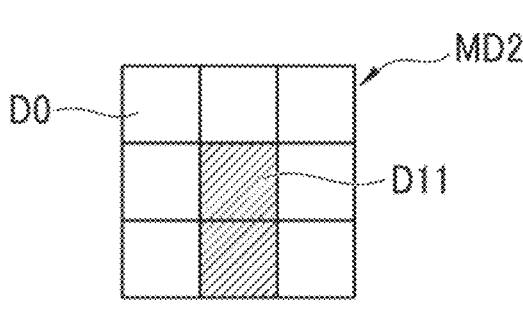
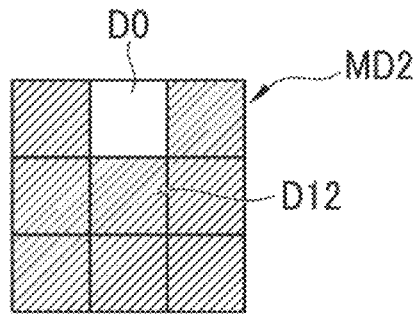
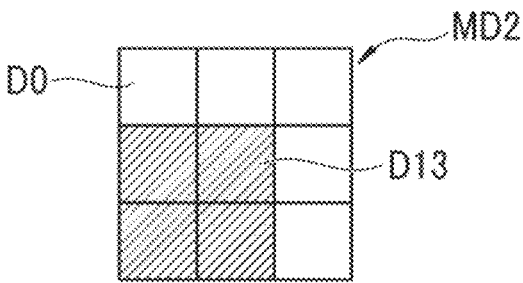
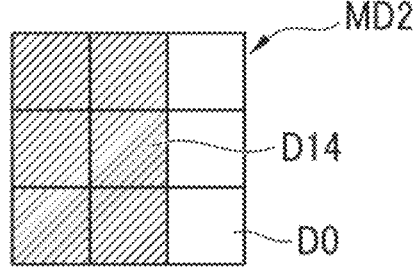

FIG. 10
(SAMPLE 1) BINDER AMOUNT: FILLING OF 60%
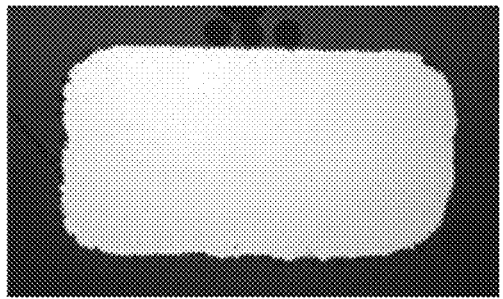
(SAMPLE 2) BINDER AMOUNT: FILLING OF 68%
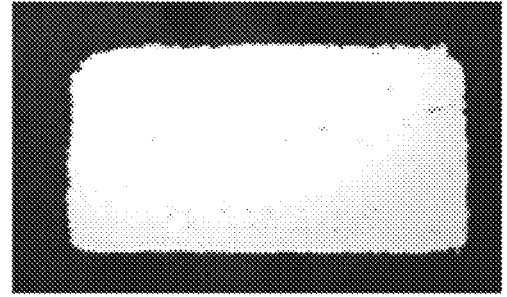
(SAMPLE 3) BINDER AMOUNT: FILLING OF 76%
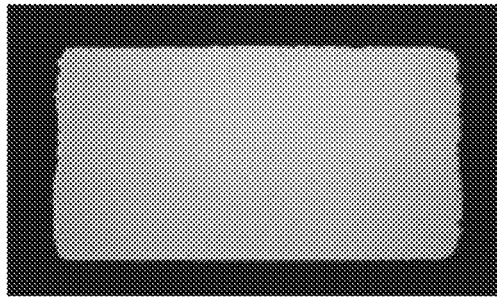

METHOD FOR MANUFACTURING THREE-DIMENSIONAL SHAPED OBJECT, AND THREE-DIMENSIONAL SHAPING APPARATUS

The present application is based on, and claims priority from JP Application Serial Number 2022-053041, filed Mar. 29, 2022, the disclosure of which is hereby incorporated by reference herein in its entirety.

BACKGROUND

1. Technical Field

The present disclosure relates to a method for manufacturing a three-dimensional shaped object, and a three-dimensional shaping apparatus.

2. Related Art

In the related art, for example, as described in JP-A-2005-120475, a method for manufacturing a three-dimensional shaped object by forming a powder layer and discharging a liquid containing a binder from a nozzle to a shaping region of the three-dimensional shaped object in the powder layer has been known.

The shaped object in a state of being cured by the binder does not have sufficient mechanical strength, and particularly, chipping or the like may occur in a contour portion.

SUMMARY

According to an aspect of the present disclosure, there is provided a method for manufacturing a three-dimensional shaped object, the manufacturing method including: a powder layer formation step of disposing powders containing a forming material of the three-dimensional shaped object in a layer shape and forming a powder layer having a predetermined thickness; and a molded body formation step of discharging, to the powder layer, a binder liquid containing a binder for binding the powders to one another, and forming a molded body in which the powders are bound to one another, in which in the molded body formation step, in a formation region of the molded body in the powder layer, a discharging amount of the binder liquid per unit area to a first formation region that is a contour portion of the formation region and a discharging amount of the binder liquid per unit area to a second formation region other than the contour portion are discharging amounts different from each other.

According to another aspect of the present disclosure, there is provided a three-dimensional shaping apparatus including: a shaping table; a powder layer formation portion configured to form a powder layer on the shaping table; a head configured to discharge a binder liquid containing a binder to a formation region of a molded body in the powder layer; and a control unit configured to control a movement and a discharging operation of the head to the shaping table, in which in an operation of forming a molded body by discharging the binder liquid to the powder layer, the control unit sets, in a formation region of the molded body in the powder layer, a discharging amount of the binder liquid per unit area to a first formation region that is a contour portion of the formation region and a discharging amount of the binder liquid per unit area to a second formation region other than the contour portion as discharging amounts different from each other.

BRIEF DESCRIPTION OF THE DRAWINGS

FIG. 1 is a schematic configuration diagram of a three-dimensional shaping apparatus according to an embodiment.

FIG. 3 is a flowchart of the method for manufacturing the three-dimensional shaped object according to the embodiment.

FIG. 5 is a schematic plan view showing a distribution state of a binder liquid in a powder layer 500.

FIG. 9 is a diagram showing dots in which data D11, D12, D13, and D14 are disposed and surrounding dots.

FIG. 10 is a cross-sectional photograph of samples of a shaped object produced in an example.

DESCRIPTION OF EXEMPLARY EMBODIMENTS

Figure 2:
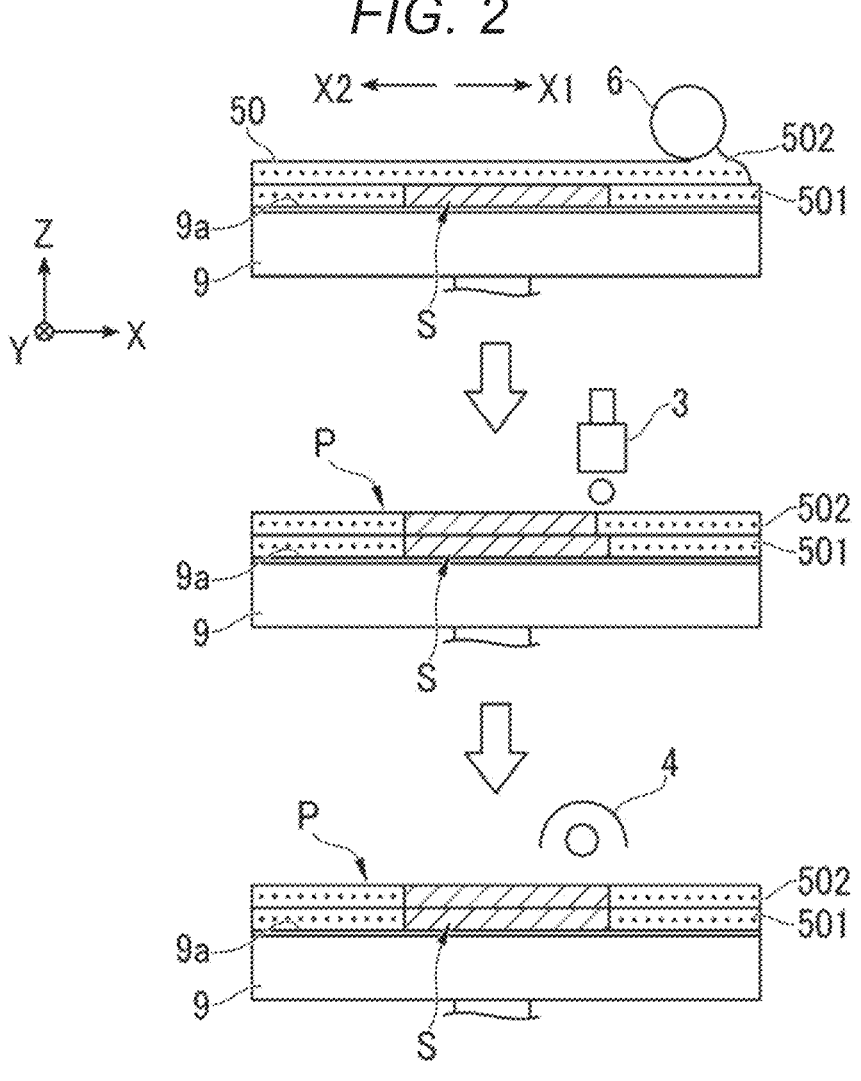
FIG. 2 is a step diagram of a method for manufacturing a three-dimensional shaped object according to the embodiment.

Hereinafter, an embodiment of a method for manufacturing a three-dimensional shaped object will be described using drawings.

A scope of the present disclosure is not limited to the following embodiment, and can be optionally changed within a scope of a technical idea of the present disclosure. Further, in the following drawings, in order to make each configuration easy to understand, a scale, the number, and the like of each structure are made different from those of an actual structure.

Figure 1:
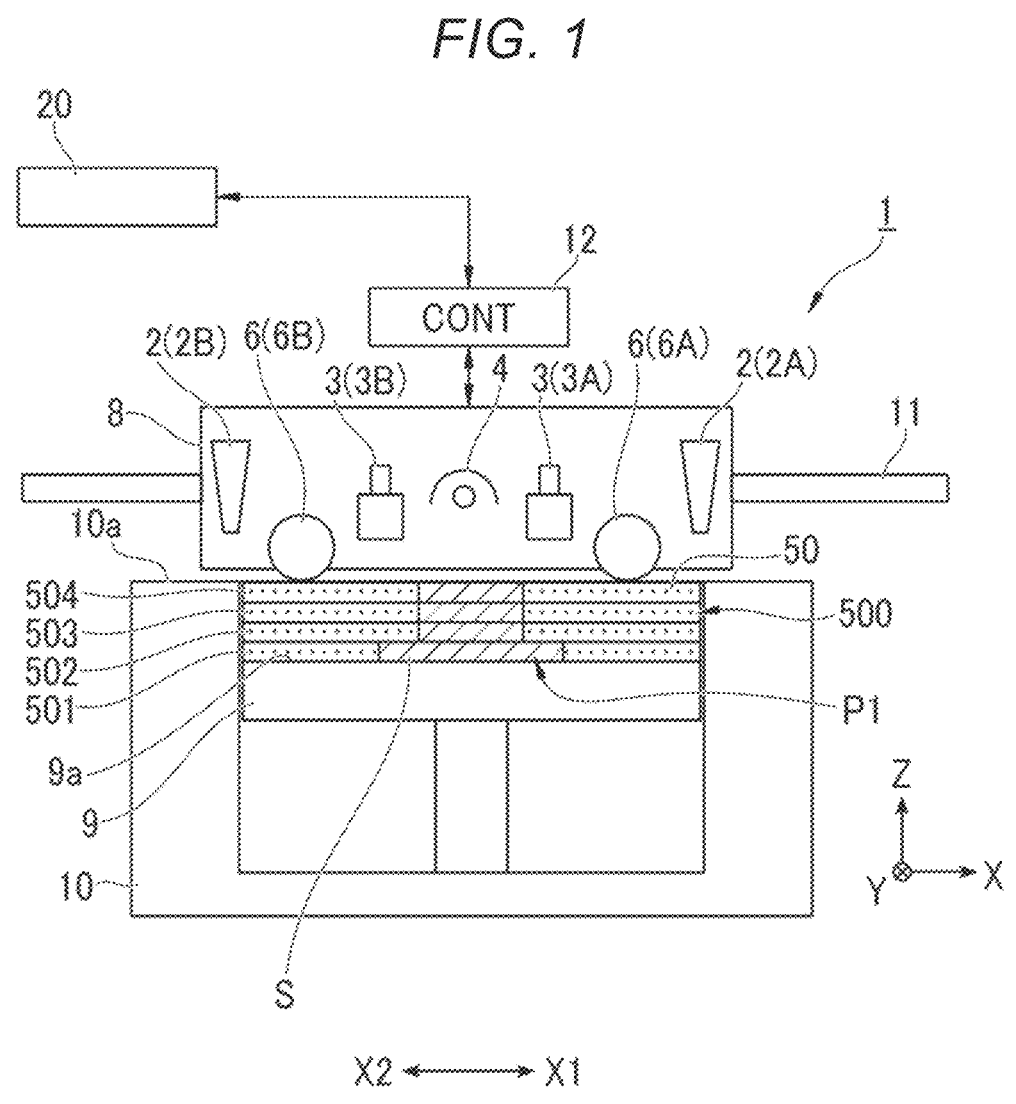

FIG. 1 is a schematic configuration diagram of a three-dimensional shaping apparatus according to the embodiment.

An X direction in FIG. 1 and the drawings described later is a horizontal direction, and corresponds to a reciprocating direction of a supply unit 8. In the X direction, an X1 direction corresponds to a forward direction, and an X2 direction corresponds to a backward direction. A Y direction is a horizontal direction and a direction orthogonal to the X direction, and corresponds to a direction in which a rotation axis of a roller 6 extends. A Z direction is a vertical direction, and corresponds to a stacking direction of powder layers 500.

The term "three-dimensional shaping" in the present specification refers to forming a so-called three-dimensional shaped object, and includes, for example, forming a shape having a thickness even in a flat-plate shape, that is, a so-called two-dimensional shape.

A three-dimensional shaping apparatus 1 is a three-dimensional shaping apparatus that manufactures a three-dimensional shaped object by stacking a plurality of powder layers 500. As shown in FIG. 1, the three-dimensional shaping apparatus 1 according to the embodiment includes a table unit 10 including a shaping table 9, the supply unit 8 that supplies a shaping material of the three-dimensional shaped object to the shaping table 9, and a control unit 12 that controls operations of the table unit 10 and the supply unit 8. The three-dimensional shaping apparatus 1 is electrically coupled to an external apparatus 20 such as a personal computer. The three-dimensional shaping apparatus 1 can receive an instruction from a user via the external apparatus 20.

The shaping table 9 can move in the Z direction under control of the control unit 12. An upper surface of the shaping table 9 is a shaping surface 9a. In the three-dimensional shaping apparatus 1, the shaping surface 9a is disposed at a position lower than an upper surface portion 10a of the table unit 10 by a predetermined distance in the Z direction, and a powder 50 containing a forming material of the three-dimensional shaped object is supplied from the supply unit 8 to the shaping surface 9a to form the powder layer 500 of one layer. The powder layer is stacked by repeating the movement to a lower side of the shaping table 9 by a predetermined distance and the supply of the powder 50 from the supply unit 8. FIG. 1 shows a state where powder layer formation of four layers including powder layers 501, 502, 503, and 504 is repeated to form a molded body S of the three-dimensional shaped object on the shaping surface 9a.

The supply unit 8 can reciprocate in the X direction along a guide bar 11. The supply unit 8 includes a powder supply portion 2 that supplies the powder 50 containing the forming material of the three-dimensional structure, such as a metal, ceramic, or a resin, to the shaping table 9. The supply unit 8 according to the embodiment includes, as the powder supply portion 2, a powder supply portion 2A positioned at a leading side end portion of the supply unit 8 in the X1 direction, and a powder supply portion 2B positioned at a leading side end portion of the supply unit 8 in the X2 direction.

The supply unit 8 includes the roller 6. The roller 6 can compress and smooth the powder 50 supplied to the shaping table 9. The supply unit 8 according to the embodiment includes, as the roller 6, a roller 6A positioned near the powder supply portion 2A in the X-axis direction, and a roller 6B positioned near the powder supply portion 2B in the X-axis direction. In the embodiment, the two powder supply portions 2A and 2B and the two rollers 6A and 6B constitute a powder layer formation portion that forms the powder layer 500 on the shaping table 9. The supply unit 8 may include a squeegee that can smooth the shaping material supplied to the shaping table 9 instead of using the roller 6.

The supply unit 8 includes a head 3 that discharges a binder liquid containing a binder for binding the powder 50 supplied from the powder supply portion 2 from a nozzle to a formation region P of the three-dimensional shaped object. In the embodiment, the head 3 includes a head 3A positioned near the roller 6A in the X-axis direction, and a head 3B positioned near the roller 6B in the X-axis direction. In the case of the embodiment, the liquid discharged from the head 3A and the head 3B is a common liquid.

The binder liquid discharged from the head 3 is a liquid containing an ultraviolet-ray-curable resin as the binder. The binder liquid is not limited to the liquid containing the ultraviolet-ray-curable resin, and a liquid containing a thermosetting resin as the binder, a liquid in which a solid resin as the binder is dissolved in a volatile solvent, or the like may be used.

The supply unit 8 includes an ultraviolet ray irradiation portion 4 that radiates ultraviolet rays capable of curing the ultraviolet-ray-curable resin at a position between the head 3A and the head 3B in the X-axis direction. The supply unit 8 according to the embodiment is a configuration including one ultraviolet ray irradiation portion 4, but may be a configuration including two or more ultraviolet ray irradiation portions 4. The supply unit 8 can also be configured not to include the ultraviolet ray irradiation portion 4 according to a type of a liquid to be used or the like. The supply unit 8 can also be configured to include a heater for curing the thermosetting resin or a heater for volatilizing the solvent in the binder liquid, instead of using the ultraviolet ray irradiation portion 4.

As shown in FIG. 1, in the supply unit 8 according to the embodiment, the components are arranged in the X-axis direction, and are disposed symmetrically with respect to a center of the supply unit 8 in the X-axis direction. With this configuration, the three-dimensional shaping apparatus 1 according to the embodiment can execute both a step of forming the molded body S by moving the supply unit 8 in the X1 direction and a step of forming the molded body S by moving the supply unit 8 in the X2 direction.

As the powder of the shaping material that can be used in the three-dimensional shaping apparatus 1, for example, a single powder such as magnesium (Mg), iron (Fe), cobalt (Co), chromium (Cr), aluminum (Al), titanium (Ti), copper (Cu), or nickel (Ni), a powder of an alloy (maraging steel, stainless steel (SUS), cobalt chromium molybdenum, a titanium alloy, a nickel alloy, an aluminum alloy, a cobalt alloy, or a cobalt chromium alloy) containing one or more of these metals, or a mixed powder of these can be used.

Further, the powder of the shaping material may contain a ceramic powder. As the ceramic powder, for example, a powder of silicon dioxide, titanium dioxide, aluminum oxide, zirconium oxide, silicon nitride, or the like can be preferably used.

As the resin powder that can be used as the shaping material, or the binder contained in the binder liquid, for example, PMMA (acrylic), acrylonitrile-butadiene-acrylic acid ester (ABS), acrylonitrile-styrene-acrylic acid ester (ASA), polylactic acid (PLA), polyetherimide (PEI), polycarbonate (PC), polypropylene (PP), polyethylene (PE), polyamide (PA), epoxy (EP), polyphenylene sulfide (PPS), polystyrene (PS), paraffin wax, polyvinyl alcohol (PVA), carboxymethyl cellulose, polyoxymethylene, polymethyl methacrylate, or the like can be preferably used. Further, for example, an acrylic resin, an epoxy resin, a silicone resin, a cellulose-based resin, other synthetic resins, or the like can be used alone or in combination. Furthermore, the thermosetting resin, or an ultraviolet-ray-curable resin of a type using radical polymerization of an unsaturated double bond such as acryl, or a type using cationic polymerization such as epoxy can also be used.

Examples of the solvent contained in the binder liquid include water, (poly) alkylene glycol monoalkyl ethers such as ethylene glycol monomethyl ether, ethylene glycol monoethyl ether, propylene glycol monomethyl ether, and propylene glycol monoethyl ether, acetic acid esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, and ionic liquids such as tetraalkylammonium acetate (for example, tetrabutylammonium acetate), and one type or a combination of two or more types selected from these can be used.

Next, an example of the method for manufacturing the three-dimensional shaped object that can be executed using the three-dimensional shaping apparatus 1 in FIG. 1 will be described with reference to FIGS. 2 to 9. FIG. 2 shows an example of a step of forming the powder layer 502 among the powder layers 500 of the molded body S. FIG. 3 is a flowchart of the method for manufacturing the three-dimensional shaped object according to the embodiment.

As shown in FIG. 3, the method for manufacturing the three-dimensional shaped object according to the embodiment includes seven steps including steps S110, S120, S130, S140, S150, S160, and S170.

First, in the shaping data input step of step S110, shaping data of the three-dimensional shaped object to be manufactured is input. An input source of the shaping data of the three-dimensional shaped object is not particularly limited, and the shaping data can be input to the three-dimensional shaping apparatus 1 by using the external apparatus 20. The shaping data supplied from the external apparatus 20 is input to the control unit 12.

Next, in the powder layer formation step of step S120, under control of the control unit 12, the three-dimensional shaping apparatus 1 supplies the powder 50 from the powder supply portion 2 to the shaping surface 9a of the shaping table 9, and compresses and levels the material by the roller 6, so that the powder layer 500 is formed. An uppermost state in FIG. 2 represents a state where the powder layer 502 is formed by moving the supply unit 8 in the X1 direction. Here, when the powder layer 500 is formed by moving the supply unit 8 in the X1 direction, the powder is supplied from the powder supply portion 2A, and the powder is compressed and leveled by the roller 6A, so that the powder layer 500 is formed. On the other hand, when the powder layer 500 is formed by moving the supply unit 8 in the X2 direction, the powder is supplied from the powder supply portion 2B, and the powder is compressed and leveled by the roller 6B, so that the powder layer 500 is formed.

Next, the molded body S is formed in the powder layer 502 by the binder liquid discharging step of step S130 and the powder binding step of step S140. That is, steps S130 and S140 constitute a molded body formation step in the embodiment. The molded body S is a structure having a predetermined shape in which powders that constitute the powder layer 502 are bound to one another by the binder, and is a so-called green body.

In the binder liquid discharging step of step S130, the binder liquid containing the binder is discharged from the nozzle of the head 3 to the formation region P of the molded body S in the powder layer 500. A second state from a top in FIG. 2 represents a state where the binder liquid is discharged from the nozzle of the head 3 to the formation region P of the powder layer 502 while moving the supply unit 8 in the X1 direction. Here, when the powder layer 500 is formed by moving the supply unit 8 in the X1 direction, the binder liquid is discharged from the head 3A. On the other hand, when the powder layer 500 is formed by moving the supply unit 8 in the X2 direction, the binder liquid is discharged from the head 3B.

In the powder binding step of step S140, the binder liquid discharged to the formation region P of the three-dimensional shaped object in the powder layer 500 is processed, and the powder 50 is bound together with the binder. In the embodiment, the ultraviolet rays are radiated from the ultraviolet ray irradiation portion 4 toward the formation region P of the three-dimensional shaped object in the powder layer 500, and the binder contained in the binder liquid is cured. A lowermost state in FIG. 2 represents a state where the ultraviolet rays are radiated from the ultraviolet ray irradiation portion 4 toward the formation region P of the three-dimensional shaped object in the powder layer 502 while moving the supply unit 8 in the X1 direction.

The powder binding is not limited to binding the powder 50 by curing the ultraviolet-ray-curable resin contained in the binder liquid with the ultraviolet rays. As described above, the liquid containing the thermosetting resin as the binder, the liquid in which the solid resin as the binder is dissolved in the volatile solvent, or the like may be used. When the thermosetting resin or the resin dissolved in the solvent is used, the supply unit 8 may include the heater for curing the thermosetting resin or the heater for volatilizing the solvent in the binder liquid instead of using the ultraviolet ray irradiation portion 4, and may perform a heat process on the discharged binder liquid to bind the powder 50 together with the binder.

In the shaping data completion determination step of step S150, the control unit 12 of the three-dimensional shaping apparatus 1 determines whether the formation of the powder layer 500 based on the shaping data input in step S110 is all completed. When it is determined that the formation of the powder layer 500 is not all completed, the process returns to the powder layer formation step of step S120, and the next powder layer 500 is formed. On the other hand, when it is determined that the formation of the powder layer 500 is all completed, the process proceeds to the debinding step of step S160.

Here, the binder liquid discharging step of step S130 in the embodiment will be described in more detail with reference to FIGS. 4 to 9.

Figure 4:
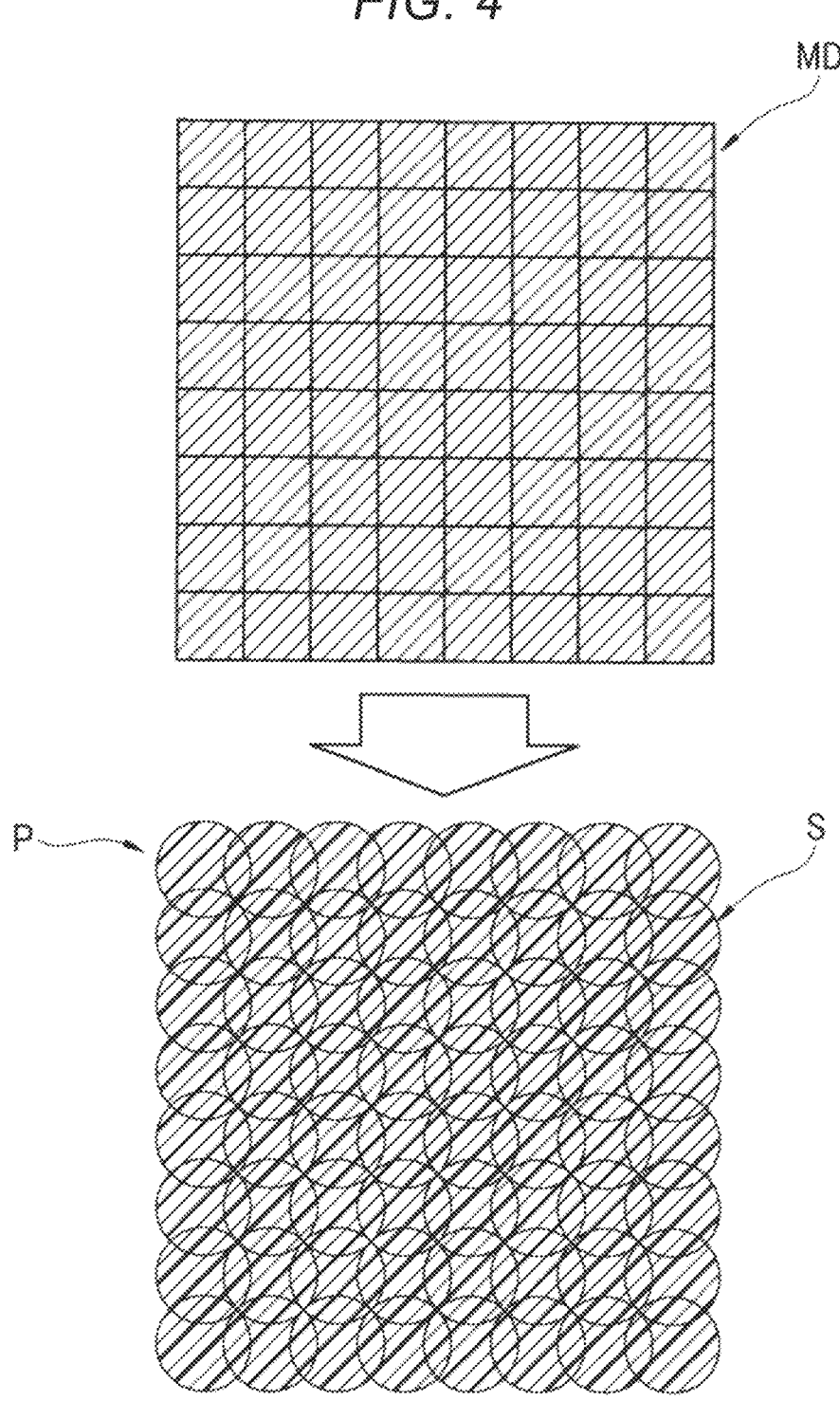
FIG. 4 is a schematic diagram showing a relationship between shaping data and a droplet discharged from a head 3.

FIG. 4 is a schematic diagram showing a relationship between the shaping data and a droplet discharged from the head 3.

In the binder liquid discharging step, the control unit 12 of the three-dimensional shaping apparatus 1 performs a process of forming the molded body S in one powder layer by controlling the head 3 to discharge the binder liquid according to shaping data MD input from the external apparatus 20. In the embodiment, the control unit 12 performs a molded body formation process by a so-called raster scan method in which the binder liquid is discharged while moving the head 3 in the X direction, and after the discharging of the droplet in the X direction for one row is completed, the head 3 is moved by one dot in the Y direction, and the droplet is discharged for the row.

In FIG. 4, an upper part represents the shaping data MD, and a lower part shows the molded body S in one layer formed based on the shaping data MD. Each lattice of the shaping data MD indicates each coordinate of the molded body S. When landing at coordinates designated by the shaping data MD, the binder liquid discharged from the head 3 also spreads to surrounding coordinates. Therefore, the binder liquid that lands at the coordinates forms the molded body S while overlapping with binder liquids at surrounding coordinates. A diameter of a dot formed at each of the coordinates is, for example, 50 μm per dot.

Figure 5:
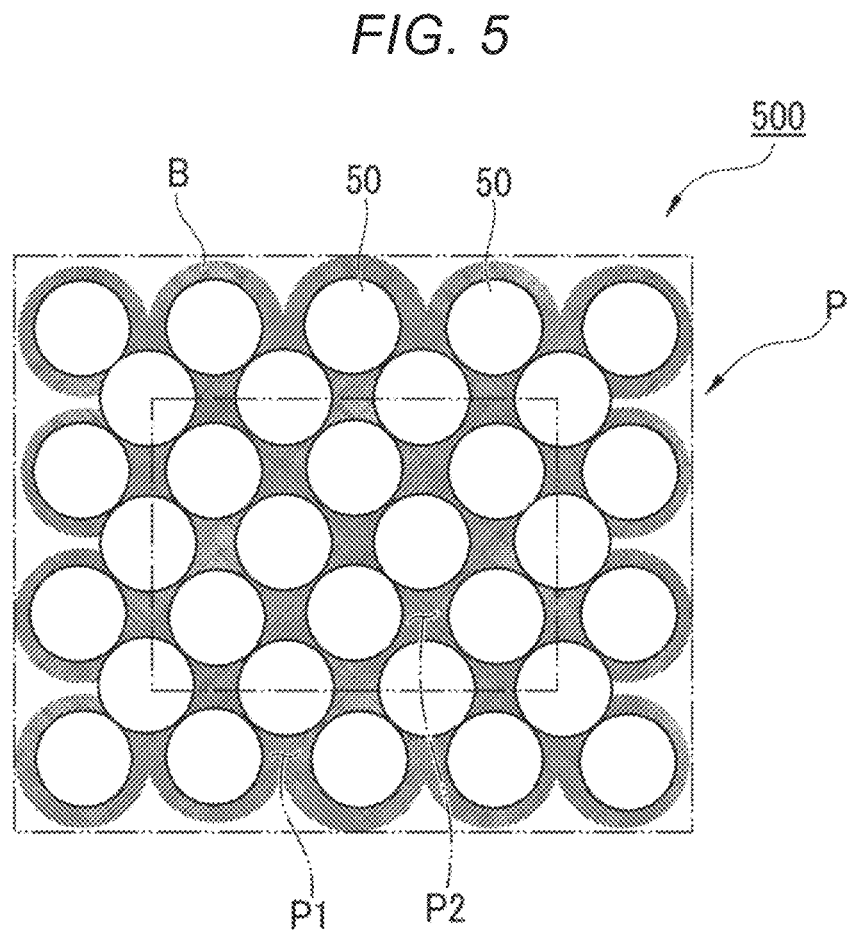

Here, FIG. 5 is a schematic plan view showing a distribution state of the binder liquid in the powder layer 500. FIG. 5 shows the formation region P of the molded body S in the powder layer 500. A binder liquid B discharged to the formation region P permeates into gaps among the powders 50, and wraps and holds a plurality of powders 50. As shown in FIG. 4, in a contour portion of the formation region P, since an overlapping area in which adjacent dots overlap with each other is small, when compared with a dot in a region on an inner side with respect to the contour portion, an amount of the binder liquid present in one dot is reduced. As a result, as shown in FIG. 5, when the powder 50 positioned in a first formation region P1 that is the contour portion of the formation region P and the powder 50 positioned in a second formation region P2 on an inner side with respect to the contour portion are compared with each other, the binder liquid B adhered to the powder 50 in the first formation region P1 is fewer than the binder liquid B adhered to the powder 50 in the second formation region P2. Accordingly, in the first formation region P1, an amount of the binder that binds the powders 50 to one another is relatively small.

When the amount of the binder is small in the first formation region P1 that is the contour portion of the molded body S, a binding force among the powders 50 is weak in the vicinity of a surface of the molded body S. After the molded body S is formed, a step of removing the unbound powder 50 from the surface of the molded body S and a step of transporting the molded body S to a sintering furnace are executed. When the binding force among the powders 50 is weak in the vicinity of the surface of the molded body S, the powders 50 may be excessively removed from the surface of the molded body S, or a surface layer portion of the molded body S may be chipped, and the shape of the molded body S may be impaired.

Therefore, in the method for manufacturing the three-dimensional shaped object according to the embodiment, in the formation region P of the molded body S in the powder layer 500, a discharging amount of the binder liquid B per unit area for the first formation region P1 that is the contour portion of the formation region P and a discharging amount of the binder liquid B per unit area for the second formation region P2 other than the contour portion are discharging amounts different from each other. According to the method, the discharging amounts of the binder liquids B can be controlled independently of each other in the first formation region P1 and the second formation region P2. Therefore, the amount of the binder supplied to the first formation region P1 can be relatively increased.

Figure 6:
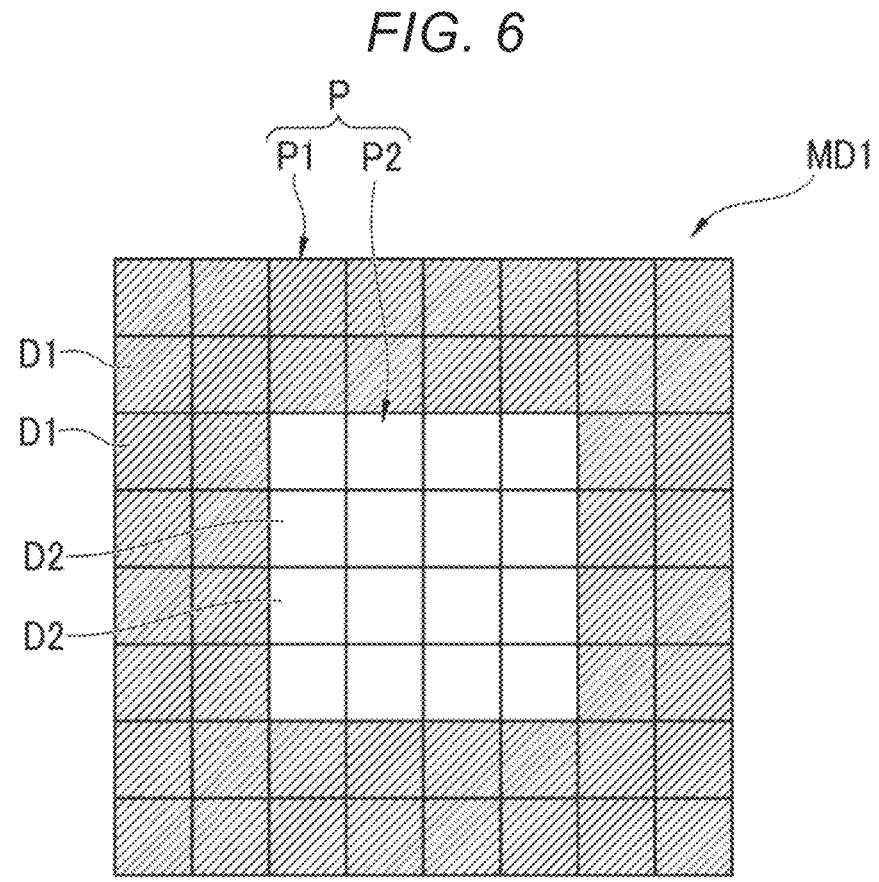
FIG. 6 is a diagram showing correction shaping data MD1.

For example, in the binder liquid discharging step of step S130, correction shaping data MD1 shown in FIG. 6 is used. The correction shaping data MD1 is shaping data corresponding to the formation region P shown in FIG. 5. In the correction shaping data MD1, data D1 for discharging a relatively large amount of the binder liquid B from the head 3 is disposed at a contour portion two dots away from an outermost periphery of the formation region P, and data D2 for discharging a relatively small amount of the binder liquid B from the head 3 is disposed in a region on an inner side with respect to the contour portion. In the correction shaping data MD1, the frame-shaped region two dots away from the outermost periphery corresponds to the first formation region P1, and the region of 4 dots×4 dots in a central portion of the correction shaping data MD1 corresponds to the second formation region P2.

The correction shaping data MD1 is created by the control unit 12 correcting the shaping data MD input from the external apparatus 20. That is, the control unit 12 detects the formation region of the molded body in the input shaping data MD, and detects the contour portion of the formation region. In the formation region of the molded body, the data D1 for causing the head 3 to discharge the relatively large amount of the binder liquid B is disposed in the region corresponding to the contour portion, and the data D2 for causing the head 3 to discharge the relatively small amount of the binder liquid B is disposed in the region corresponding to the portion other than the contour portion. Based on the original shaping data MD, the control unit 12 may create both the data D1 and D2, or may create only either one of the data D1 and D2. Further, the correction shaping data MD1 may be created by the external apparatus 20.

Figure 7:
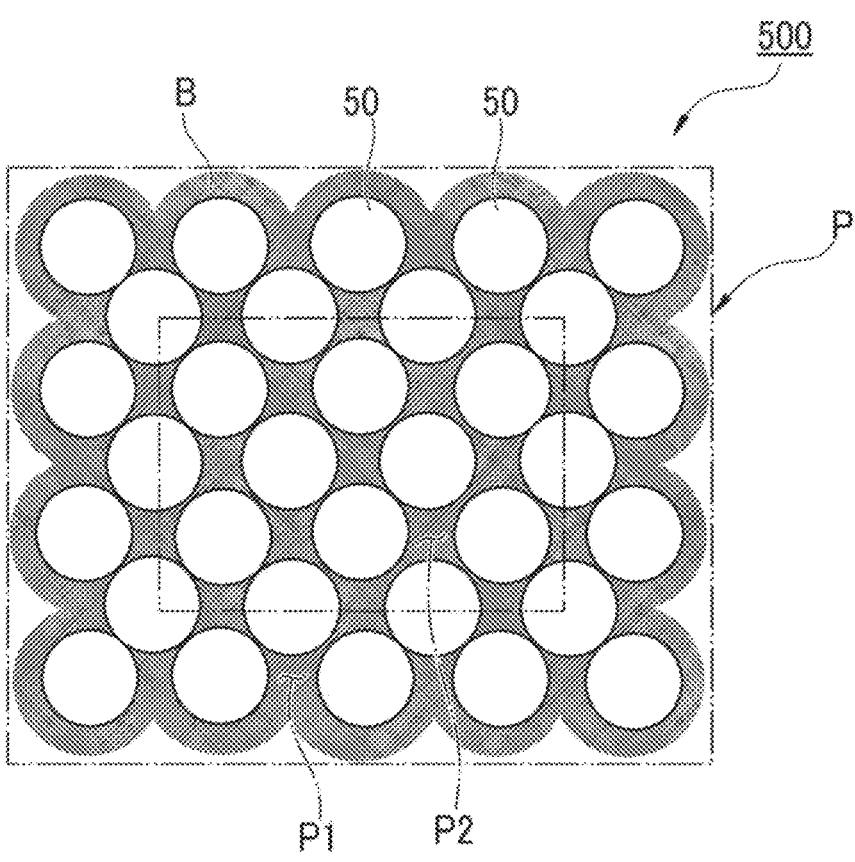
FIG. 7 is a schematic plan view showing a distribution state of the binder liquid in the powder layer 500 when the correction shaping data MD1 shown in FIG. 6 is used.

FIG. 7 is a schematic plan view showing a distribution state of the binder liquid in the powder layer 500 when the correction shaping data MD1 shown in FIG. 6 is used.

As shown in FIG. 7, a larger amount of the binder liquid B can be disposed in the first formation region P1 that is the contour portion of the formation region P by discharging the binder liquid B to the powder layer 500 based on the correction shaping data MD1. Accordingly, an appropriate amount of the binder liquid B can also be adhered to the powders 50 positioned in the first formation region P1. As a result, the powders 50 can be sufficiently strongly bound to one another in the vicinity of the surface of the molded body S. Since mechanical strength of the surface of the molded body S can be improved, it is possible to prevent occurrence of a shape defect caused by the powders 50 falling off from the surface of the molded body S. Since the strength of the molded body S itself is improved, it is easy to remove the unbound powders 50 from the molded body S. Further, handling the molded body S is easy. Furthermore, since the amount of the binder is more uniform in the entire molded body S, it is possible to prevent thermal strain and a density variation in the debinding step and the sintering step of the molded body S. As a result, it is possible to manufacture a three-dimensional shaped object excellent in quality such as strength, accuracy, and texture.

In the example shown in FIG. 7, as compared with the example shown in FIG. 5, distributions of the binder liquids B in the first formation region P1 and the second formation region P2 are optimized by increasing the discharging amount of the binder liquid B per unit area in the first formation region P1. The present disclosure is not limited to the method. The distributions of the binder liquids B in the first formation region P1 and the second formation region P2 may be optimized by decreasing the discharging amount of the binder liquid B per unit area in the second formation region P2. For example, when a concentration of the binder of the binder liquid B is too high, a defect due to too much binder may occur in the second formation region P2 other than the contour portion. In such a case, it is possible to prevent occurrence of the defect in the entire molded body S by decreasing the amount of the binder in the second formation region P2.

In the embodiment, the discharging amount of the binder liquid B per unit area to the powder layer 500 can be varied by changing a size of the droplet of the binder liquid B. Alternatively, the discharging amount of the binder liquid B per unit area to the powder layer 500 can be varied by changing the number of the droplets of the binder liquid B.

A method for adjusting the discharging amount of the binder liquid B can be selected based on physical properties of the powder 50 and the binder liquid B, a scanning speed of the supply unit 8, and the like. Any one of the adjustment methods described above can easily adjust the discharging amount of the binder liquid B.

Figure 8:
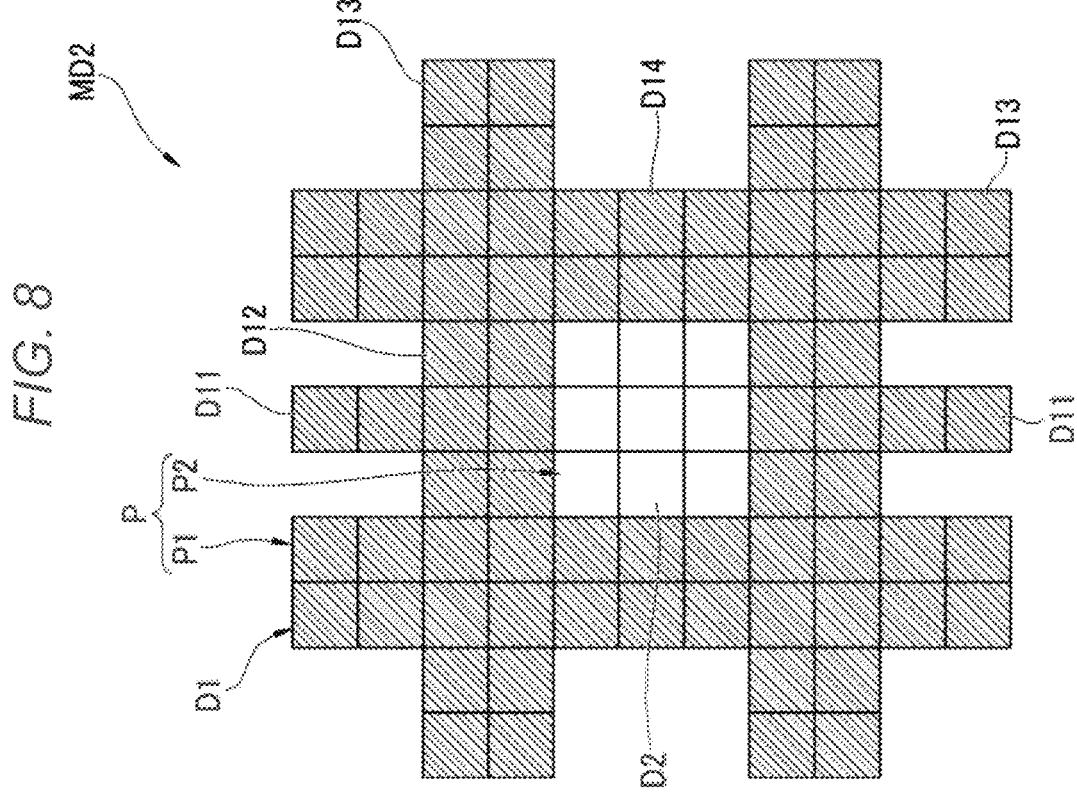
FIG. 8 is a schematic diagram showing another example of the correction shaping data.

Further, in the method for manufacturing the three-dimensional shaped object according to the embodiment, the discharging amount of the binder liquid B per unit area may be varied at each position in the contour portion based on the shape of the formation region P. Hereinafter, description will be made with reference to FIG. 8. FIG. 8 is a schematic diagram showing another example of the correction shaping data.

Correction shaping data MD2 shown in FIG. 8 is created based on shaping data of the same planar shape. In the formation region P of the correction shaping data MD2, a region excluding a region of 3 dots×3 dots at a central portion is the first formation region P1 that is the contour portion. The region of 3 dots×3 dots at the central portion is the second formation region P2 other than the contour portion.

Further, in the correction shaping data MD2, data for increasing or decreasing the discharging amount of the binder liquid B per unit area is disposed according to a position in the first formation region P1. In the correction shaping data MD2, data D1 for relatively increasing the discharging amount of the head 3 is disposed in the first formation region P1. Further, as shown in FIG. 8, the data D1 includes four types of data D11, D12, D13, and D14. The four types of data D11 to D14 are allocated to respective dots according to positions of the dots in the first formation region P1.

The four types of data D11 to D14 are different from one another in the amount of the binder liquid B discharged from the head 3. In the embodiment, a case where the data D1 includes the four types of data D11 to D14 has been described, but the present disclosure is not limited to the configuration, and the number of stages of the discharging amount may be three or less, or five or more.

FIG. 9 is a diagram showing dots in which the data D11, D12, D13, and D14 are disposed and surrounding dots.

In the contour portion of the formation region P, the dot in which the data D11 is disposed is a dot around which an amount of the surrounding binder liquid B is the smallest. For example, the dot is a dot positioned at a tip end of a portion that protrudes to an outer side of the formation region P with a width of one dot. Regarding the dot, data D0 in which the binder liquid B is not discharged is disposed in 7 dots among surrounding 8 dots. Since an amount of the binder liquid B supplied from droplets of the adjacent dots is the smallest, the data D11 is data in which the amount of the binder liquid B discharged from the head 3 is the largest as compared with other data D12 to D14.

In the contour portion of the formation region P, a dot in which the data D12 is disposed is a dot around which an amount of the surrounding binder liquid B is the largest. For example, the dot is a dot positioned at a deepest position of a recessed portion recessed toward an inner side of the formation region P, or at an apex of a reentrant angle on an outer peripheral edge of the formation region P. Regarding the dot, the data D1 in which the binder liquid B is discharged is disposed in 7 dots among surrounding 8 dots. Since an amount of the binder liquid B supplied from droplets of the adjacent dots is the largest, the data D12 is data in which the amount of the binder liquid B discharged from the head 3 is the smallest as compared with other data D11, D13, and D14. When the data D12 is compared with the data D2 of the second formation region P2, the amount of the binder liquid B discharged from the head 3 is larger in the data D12.

In the contour portion of the formation region P, a dot in which the data D13 is disposed is a dot in which the binder liquid B is discharged to about ⅓ of surrounding dots. For example, the dot is a dot positioned at a corner portion that protrudes toward an outer side of the formation region P on the outer peripheral edge of the formation region P. Regarding the dot, the binder liquid B is discharged only in 3 dots among surrounding 8 dots. Since an amount of the binder liquid B supplied from droplets of the adjacent dots is relatively small, an amount of the binder liquid B discharged from the head 3 corresponding to the data D13 is smaller than the discharging amount corresponding to the data D11 and larger than the discharging amount corresponding to the data D12.

In the contour portion of the formation region P, a dot in which the data D14 is disposed is a dot in which the binder liquid B is discharged to about ⅔ of surrounding dots. For example, the dot is a dot positioned at an edge on a straight line on the outer peripheral edge of the formation region P. Regarding the dot, the binder liquid B is discharged to 5 dots among surrounding 8 dots. Since an amount of the binder liquid B supplied from droplets of the adjacent dots is relatively large, an amount of the binder liquid B discharged from the head 3 corresponding to the data D14 is smaller than the discharging amount corresponding to the data D11 and larger than the discharging amount corresponding to the data D13. The data D14 corresponds to an average discharging amount among the data D11 to D14. When setting the discharging amount in the data D11 to D13, the discharging amount may be increased or decreased with reference to the discharging amount of the data D14.

As described above, in the discharging amounts corresponding to the data D11 to D14, the discharging amount of the data D11 is the largest, and the discharging amounts of the data D13, D14, and D12 decrease in this order. That is, the method for manufacturing the three-dimensional shaped object using the correction shaping data MD2 is a manufacturing method in which, at each position in the first formation region P1 that is the contour portion of the formation region P, the discharging amount of the binder liquid B is varied according to an area ratio between the region in which the binder liquid B is discharged and the region in which the binder liquid B is not discharged around the position.

According to the manufacturing method, it is possible to supply an appropriate amount of the binder liquid B to a fine shape portion in the contour portion of the molded body S. Accordingly, it is possible to form the molded body S having sufficient strength even for the fine shape portion.

As described above, steps S110 to S150 described above are executed using the three-dimensional shaping apparatus 1 shown in FIG. 1, and the molded body S that is the green body is formed on the shaping table 9.

Next, in the debinding step of step S160, a resin component such as the binder contained in the molded body S is debinded using the sintering furnace or the like. The debinding step of step S160 may be performed using an apparatus other than the sintering furnace. Further, as the debinding method, in addition to the method for volatilizing the resin component by heating, a method for dissolving the resin component by immersing the molded body S in a solvent, and the like can also be adopted. The debinding step of step S160 may be omitted according to a type of the three-dimensional shaped object to be manufactured, for example, when manufacturing a three-dimensional shaped object made of resin.

In the sintering step of step S170, the molded body S debinded in the debinding step of step S160 is heated using the sintering furnace or the like to sinter a material. Even if the resin component such as the binder of the molded body S still remains after the debinding step of step S160 is executed, the resin component is removed accompanying with the execution of the sintering step of step S170. With completion of the sintering step of step S170, the method for manufacturing the three-dimensional shaped object according to the embodiment is completed.

The embodiment according to the present disclosure has been described above in detail with reference to the drawings, but the specific configuration is not limited to the embodiment, and changes, substitutions, deletions, and the like may be made without departing from the gist of the present disclosure.

In the above description, the amount of the binder is appropriately adjusted by adjusting the discharging amount of the binder liquid on a premise that the concentration of the binder of the binder liquid is constant, but the present disclosure is not limited thereto. For example, the amount of the binder may be adjusted by discharging a binder liquid in which a concentration of the ultraviolet-ray-curable resin, the thermosetting resin, or the solid resin dissolved in the solvent serving as the binder is changed.

Examples

A three-dimensional shaped object made of metal was produced by a binder jet method metal 3D printer (the three-dimensional shaping apparatus).

A metal powder used was stainless steel powder (composition: 17-4PH, particle size: about 7 μm in diameter, composition: chromium 16%, copper 4%, nickel 4%, manganese 0.5%, silicon 0.5%, niobium 0.3%, cobalt 0.25%, molybdenum 0.10%, and iron residue) manufactured by Epson Atmix Corporation. As a binder ink, a water-based ink containing an acrylic resin of 7%, a surfactant, and the like was used. As a print head, an ink jet head manufactured by Seiko Epson Corporation with a nozzle density of 300 dpi was used.

With the apparatuses and the conditions described above, rectangular-parallelepiped (length 40 mm×width 16 mm×height 8 mm) green body samples were shaped. A shape of each layer was rectangular (length 40 mm×width 16 mm), and the droplets of the binder liquid were disposed in a lattice pattern. The binder liquid with three levels for the discharging amount were prepared, and shaping was performed under three types of filling conditions of 60%, 68%, and 76% with respect to a powder non-occupied volume of the powder layer. A thickness of each powder layer was 30 μm. The produced green body was subjected to the debinding and sintering step (debinding: 450° C., in nitrogen for 2 hours, firing: 1250° C., in an argon atmosphere for 3 hours), so that finally a metal rectangular parallelepiped can be obtained.

The produced three types of samples were cut at central portions (about 20 mm from both ends) in a length direction, and an observation result of cross sections was shown in FIG. 10.

In a case of Sample 1 in which the amount of the binder was filling of 60%, edge portions were round, and shaping was incomplete. As causes for this, several factors such as handling of the green body, and powder layer formation stabilities during powder layer formation were considered.

In Sample 2 in which the amount of the binder was filling of 68% and Sample 3 in which the amount of the binder was filling of 76%, the edge shape was close to a rectangle, and shaping having high shape stability was implemented. Sample 3 obtained a shape more stable than that of Sample 2.

On the other hand, when an internal structure of the shaped object was observed using a microscope, the number of defects such as pores was the smallest in Sample 2 having the filling of 68%, and in a case of Sample 1 having the filling of 60% and Sample 3 having the filling of 76%, portions considered to be defects during the powder layer formation and pores were recognized inside the samples.

Based on the above results, it was considered that while there was an appropriate value of the binder filling amount inside the shaped object, it was preferable that the binder filling amount was higher than the appropriate value described above in the contour portion of the shaped object, and it was desirable to discharge a large amount of the binder liquid in the contour portion.

In consideration of the above results, a control function of changing the discharging amount of the binder liquid for each location was prepared in the binder jet method metal 3D printer. As the method for changing the discharging amount, a method for changing a volume of an ink droplet and a method for changing the number of minute ink droplets were selected.

By using the correction function described above, a region having three lattices (63 μm) in the contour portion of the shaped object was subjected to the correction process with the binder filling amount corresponding to 76%, and other regions were subjected to particle binding with the binder filling amount of 68%. As a result of performing cross-section cutting and microscopic observation in the same manner as in the previous experiment, a defect and the like were hardly recognized inside the shaped object, the edge portion was formed in a rectangular shape, and effects of the present disclosure was recognized.

What is claimed is:
1. A method for manufacturing a three-dimensional shaped object using a binder jet method, the manufacturing method comprising:
   a powder layer formation step of disposing powders containing a forming material of the three-dimensional shaped object in a layer shape and forming a powder layer having a predetermined thickness;
   a green body formation step of discharging, to the powder layer, a binder liquid containing a binder for binding the powders to one another, and forming a green body in which the powders are bound to one another; and
   a sintering step of sintering the binder as a resin component such that the binder contained in the green body is de-bound by heating the green body,
   wherein, in the green body formation step, in a formation region of the green body in the powder layer, the binder liquid is discharged to both a first region and a second region of the formation region, the first region is a contour portion of the formation region, and the second region is a region other than the contour portion of the formation region,
   a discharging amount of the binder liquid discharged per unit area to the first region is set to be greater than the discharging amount of the binder liquid discharged per unit area to the second region,
   the first region has an outermost periphery of the contour portion of the formation region, and the outermost periphery is divided into a plurality of positions in a plan view,
   each of the plurality of positions corresponds to one unit area on which the binder liquid is discharged as a dot,
   the discharging amount of the binder liquid per unit area is varied at each of the plurality of positions based on a plurality of configurations in which each of the plurality of positions exists as a configuration of the plurality of configurations, and
   each of the plurality of positions corresponds to a tip of a protrusion, a bottom of a recess, a corner protruding toward an outside of the formation region, and one component of a straight line of the plurality of configurations.

2. The method for manufacturing the three-dimensional shaped object using the binder jet method, according to claim 1, wherein in the green body formation step, the discharging amount of the binder liquid per unit area is varied by changing a size of a droplet of the binder liquid.

3. The method for manufacturing the three-dimensional shaped object using the binder jet method, according to claim 1, wherein in the green body formation step, the discharging amount of the binder liquid per unit area is varied by changing the number of drops of the binder liquid.

4. The method for manufacturing the three-dimensional shaped object using the binder jet method, according to claim 1, wherein the resin component is a thermosetting resin, and the binder liquid contains water as a solvent.

5. The method for manufacturing the three-dimensional shaped object using the binder jet method, according to claim 1, wherein the binder is a thermosetting resin that contains water as a solvent.

\*   \*   \*   \*   \*